INVENTOR.
Clark F. Kappelman
BY Bertha L. MacGregor
ATTORNEY

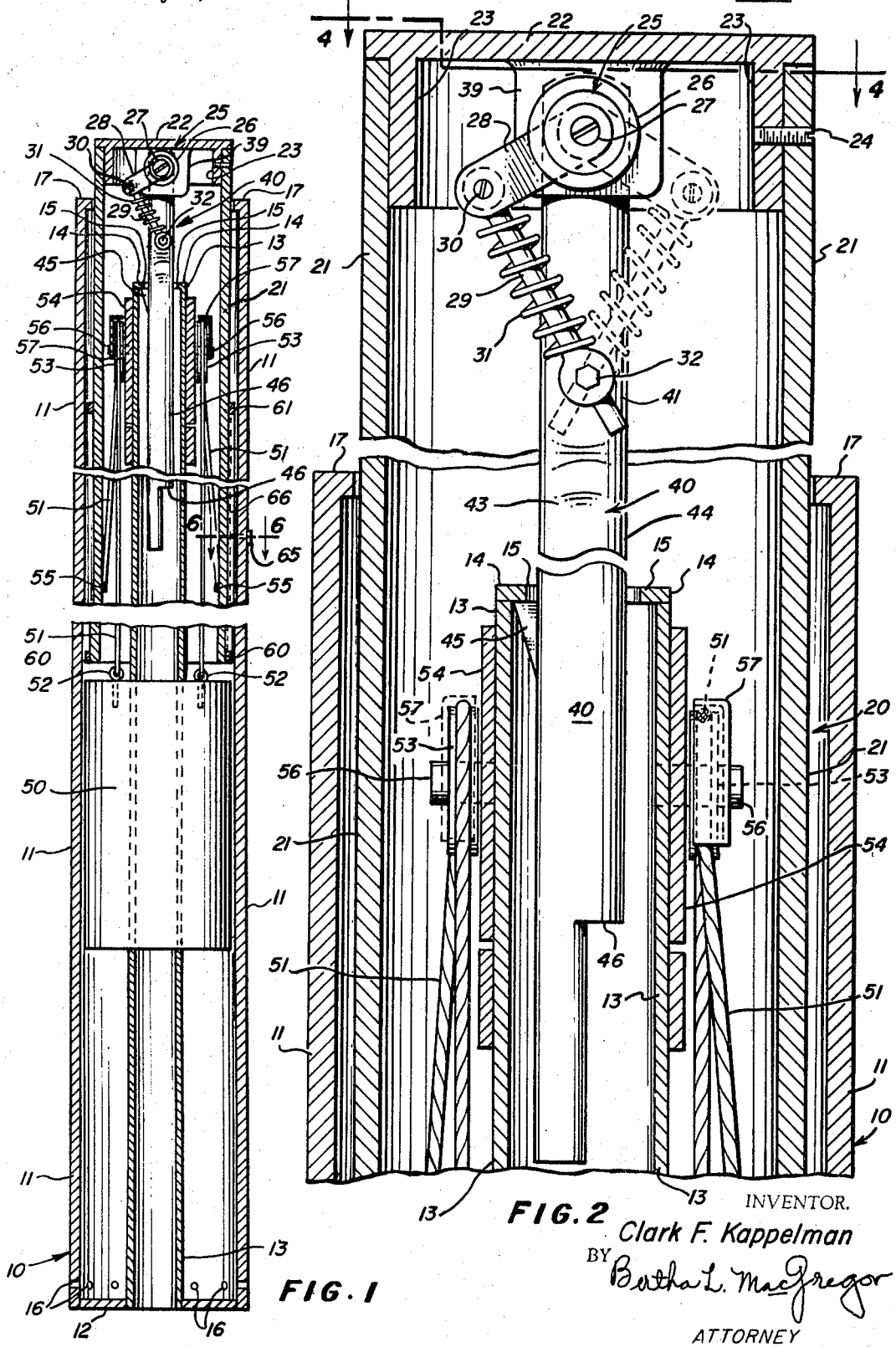

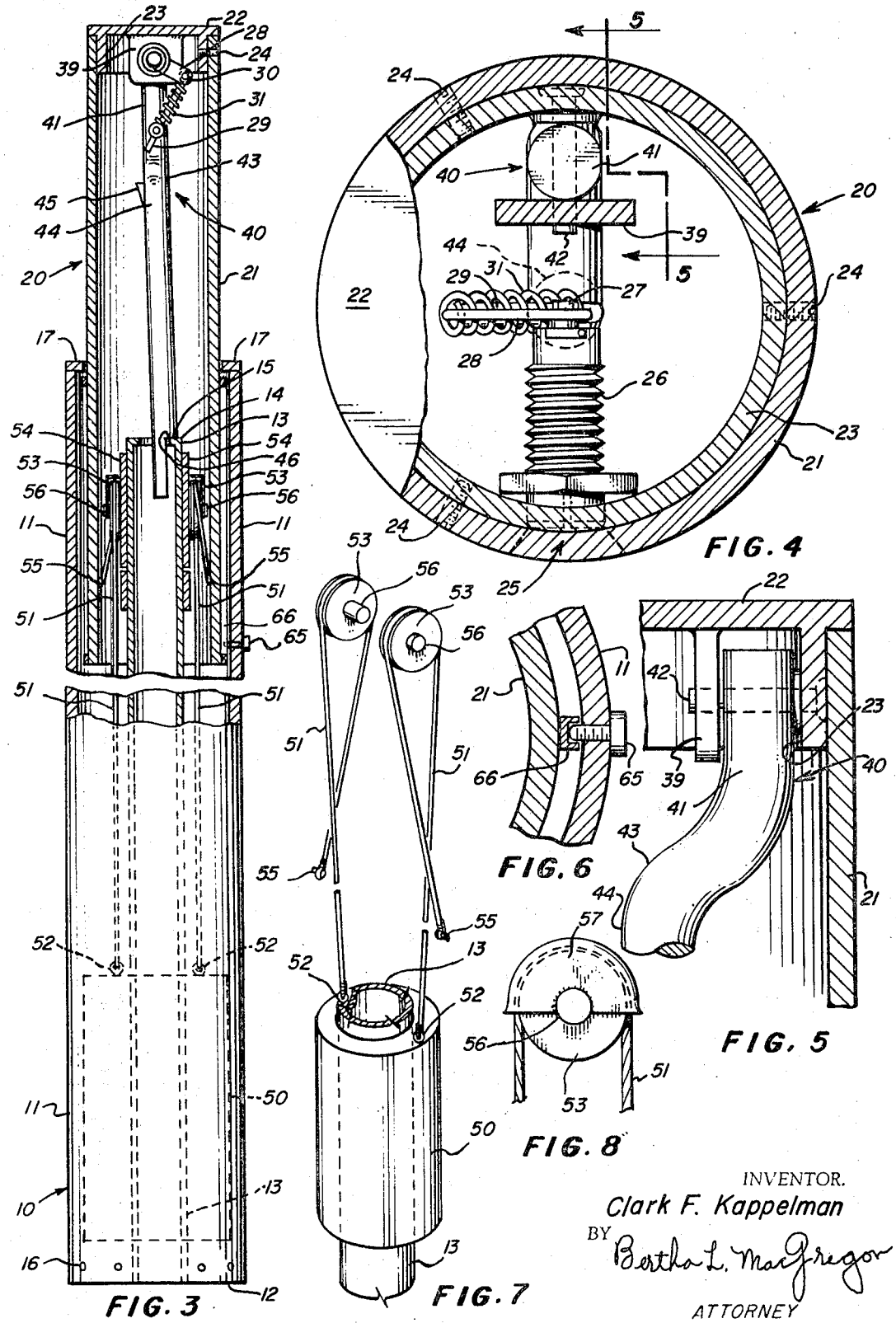

1

3,451,164
VEHICLE PARKING DEVICE
Clark F. Kappelman, 10 S. Pennsylvania St.,
Denver, Colo. 80209
Filed July 1, 1968, Ser. No. 741,587
Int. Cl. E01f 13/00; E05b 65/00
U.S. Cl. 49—35                                               12 Claims

ABSTRACT OF THE DISCLOSURE

A vehicle parking device designed to prevent unauthorized removal of a vehicle from a parking area and to prevent unauthorized occupancy of the parking area by a vehicle. The device comprises a lower housing member stationarily mounted in the earth or concrete of the area with its upper end slightly above ground level, and an upper vehicle obstructing member telescopically movable in the stationary member into and out of vehicle obstructing position. Key actuated mechanism in the movable member unlocks the movable member for automatic raising thereof into locked vehicle obstructing position. Unlocking of the mechanism when the movable member is in raised position permits manual depression of the movable member and automatic locking in the lowered unobstructing position.

---

This invention relates to a vehicle parking device designed for installation in reserved, rented or leased parking areas for the purpose of preventing unauthorized removal of a vehicle occupying the said area and of preventing unauthorized occupancy of the area by a vehicle.

The main object of the invention is to provide an efficient and dependable parking device of the character described, having an elongated stationary body portion mounted in the earth or concrete of the parking area, and an upper vehicle obstructing member telescopically mounted in the stationary member for movement into vehicle obstructing position and into non-obstructing position.

The vehicle parking device of my invention is designed for installation in individual parking spaces walled or otherwise barricaded so that a vehicle can enter and leave the parking space only at one end thereof. The parking device is installed near said one end of each parking area for one car in such position that the stationary member is buried, its lower end usually about four feet below ground level, and its upper end protruding a few inches above ground, with the telescopically movable upper member in vehicle obstructing position when raised relatively to the stationary lower member and in unobstructing position when lowered to its fullest extent into the stationary member.

The device is provided with a key actuated lock. The possessor of the key uses it to unlock the device when the upper member is in lowered unobstructing position, whereupon said upper member automatically rises to locked obstructing position. The possessor of the key also uses it to unlock the device when in its raised vehicle obstructing position, whereupon the movable member can be manually depressed and then automatically is locked in its lowered unobstructing position.

A feature of the mechanism herein shown and described is a locking rod assembly in the movable member and key actuated means for unlocking the rod to permit automatic raising of the movable member into locked vehicle obstructing position, and to permit manual depression of the movable member followed by automatic locking of the movable member in its lowered non-obstructing position.

Means also are provided for preventing water from

2 accumulating in the housing or forming of ice within the stationary member which might interfere with the free operation of the device.

The objects and advantages of the mechanism will become apparent from the drawings and following description.

FIG. 1 is a vertical sectional view of the vehicle parking device embodying my invention, showing the vehicle obstructing upper member of the device in its depressed non-obstructing position relatively to the stationary lower member of the device body.

FIG. 2 is a vertical sectional view on an enlarged scale of the upper portion of the parts shown in FIG. 1.

FIG. 3 is a vertical sectional view similar to FIG. 1 but showing the movable upper member of the device in its raised, vehicle obstructing position relatively to the stationary lower member.

FIG. 4 is a horizontal sectional view, partly in elevation, in the planes of the line 4—4 of FIG. 2.

FIG. 5 is a vertical sectional view in the planes of the lines 5—5 of FIG. 4, showing the upper part of the locking rod mounted in the housing cap.

FIG. 6 is a horizontal sectional view of a detail of construction, in the plane of the line 6—6 of FIG. 1.

FIG. 7 is a detached view of the weight, cables and pulleys which are part of the mechanism for raising and lowering the movable upper member relatively to the lower stationary member of the device.

FIG. 8 is an elevational view of one of the pulleys and its guard.

Figure 9:
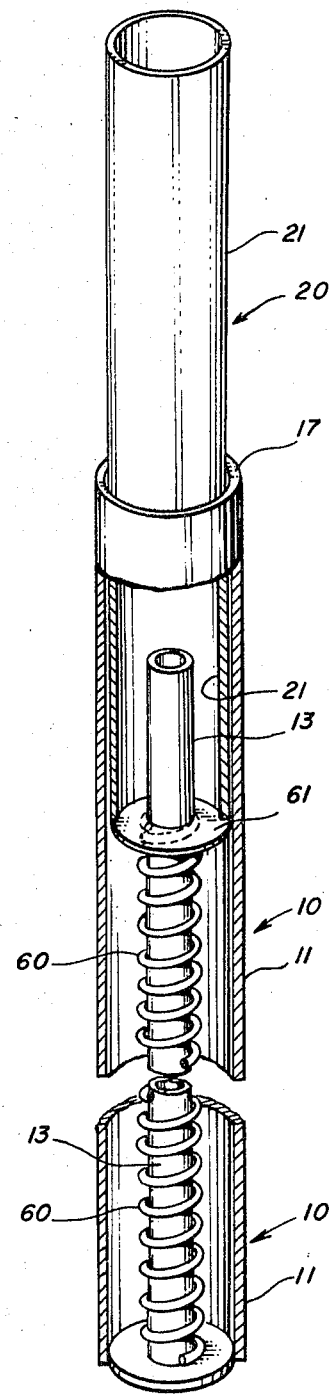
FIG. 9 is a perspective view of a modification of the invention, showing the lower stationary housing and upper vehicle obstructing member with modified means (replacing the weight and pulleys of FIGS. 1–8) for automatically raising the upper member, the locking means of FIGS. 1–3 being omitted in this view.

In the embodiment of the invention shown in the drawings, the lower member 10 comprises a cylindrical elongated hollow housing 11, lower end wall 12, and a centrally located tube 13 which rises from the end wall 12 to near the top open end of the hollow housing 11. The centrally located tube 13 terminates at its upper end in a flange 14 which is flush with the tube 13 at its diameter and extends inwardly beyond the inner diameter of the tube 13 to provide means 15 for engaging a locking rod which will be described hereinafter. The end wall 12 or the lower portion of the cylindrical housing 11 may be provided with openings 16 for drainage of water which may enter the housing 10. The upper end of the housing wall 11 may be finished with an inturned flange 17. While dimensions are not critical, it may be noted as an example of this embodiment that the outer stationary housing 11 may be a standard 4-inch pipe approximately 49 inches in length, and the centrally located tube 13 may be standard 1¼-inch pipe approximately 44 inches in length.

The upper vehicle obstructing member of my vehicle parking device is indicated as a whole at 20. It comprises a cylindrical wall 21 adapted to slide telescopically within the cylindrical outer housing 11. The wall 21 is closed at its upper end by a cap comprising a top 22 and skirt 23. The skirt 23 figs snugly within the upper end of the wall 21 and is fastened to the wall 21 by any suitable means such as set screws 24. The top 22 rests on the upper edge of the wall 21. As stated, dimensions are not critical, but as an example of the embodiment shown herein, the member 20 may be 28 inches in length and its diameter is such that the wall 21 slides easily through the flange 17 and into the outer housing 11.

The movable member 20 is provided in its wall 21 with a key actuated lock 25 having an inwardly horizontally disposed barrel 26 and bolt 27. The bolt 27 has fixedly mounted thereon a lever 28 which rotates with the bolt 27 about the axis of the bolt when the lock is actuated by the key. A pin 29 is pivotally connected at 30 to the lever 28 and is surrounded by spring 31. The lower end of the pin is pivotally connected by bolt 32 to a locking rod 40. The locking rod 40 is shorter than the cylindrical wall 21 of the movable member 20 of the device. In this embodiment, it may be approximately 19½ inches long, made of rod material ⅝-inch in diameter.

The locking rod 40 is mounted for limited pivotal movement in the member 20, as shown in FIG. 5, the upper end 41 being connected by support 39 to the cap 22. The rod is curved sufficiently to locate the major part of its length centrally of the cylindrical member 21 so that it can enter the central tube 13 of the stationary member 10. As shown in FIG. 5, the upper end 41 of the locking rod 40 is pivotally mounted adjacent the skirt 23 of the cap by bolt 42, and is curved at 43 to merge into the lower portion 44.

The locking rod 40 is provided with a rigid projecting catch 45 located about midway between the upper and lower ends of the rod, shaped to provide an upper flat surface which engages the under side of the flange 15 on the central tube 13 in the member 10. The locking rod 40 is also provided near its lower end with an inwardly cut recess which forms a shoulder 46 adapted to bear on the upper surface of the flange 15 of the centrally located tube 13 as will be explained in the operaion of the device.

FIG. 7 shows, detached, a cylindrical weight 50 slidable on the central tube 13 in the stationary housing 10. A pair of cables 51 are attached a 52 to the upper portion of the weight 50 and are trained over pulleys 53 which are rotatably mounted on opposite sides of tube 13. A spacer sleeve 54 surrounds the tube 13 between the tube and pulleys 53, with the pulley shafts 56 extending through 13 and 54. The opposite free ends of the cables 51 are attached at 55 to the inner surfaces of the wall 21 of the movable member 20. The pulleys are provided with shields 57 to prevent displacement of the cables 51 thereon. Cable directions over the pulleys are reversed for balance of the weight.

A ring 60 is mounted on the wall 21 on a horizontal level below the bottom of the locking rod 40 and another ring 61 is mounted on the wall 21 above the bottom of the locking rod 40. These rings function to prevent freezing together of the walls 21 and 11.

A screw 65 extends through the stationary wall 11 into a vertical groove 66 on the wall 21 of the movable member 20 to prevent twisting of the member 20 relatively to the stationary member 10.

In the modification shown in FIG. 9, the locking rod 40 and mechanism for moving it into and out of locking positions relatively to the central tube 13 have been omitted, but they are part of this modification and function as heretofore described. Only the weight 50, cables 51 and pulleys 53 have been eliminated and replaced by the compression spring 60 and plate 61. When the vehicle obstructing upper member is manually depressed, the spring 60 is compressed. When the locking rod 40 is released by the key actuated mechanism 25, 28, 29, the spring 60 is free to expand and automatically moves the unlocked upper member 20 into its raised position.

Figure 10:
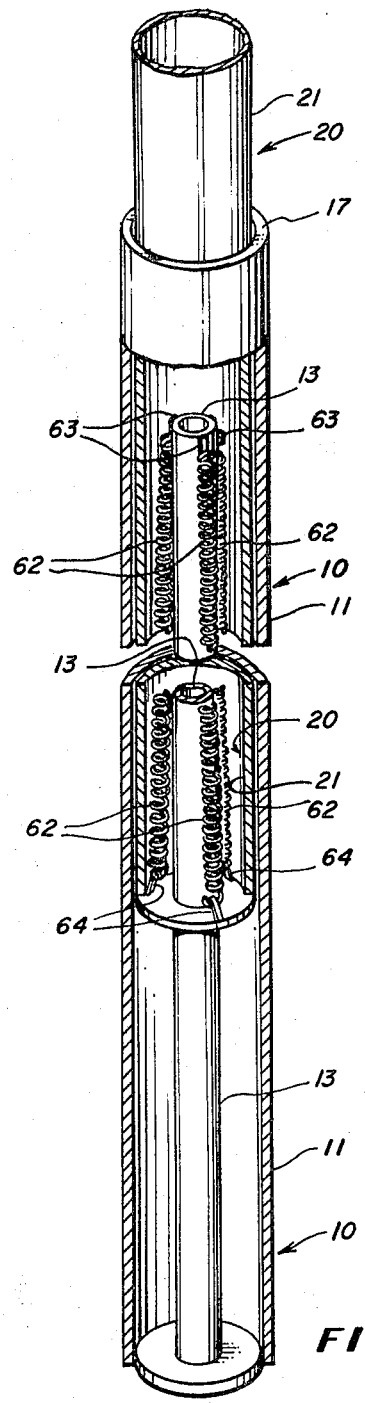
FIG. 10 is a view similar to FIG. 9 showing another modification of the means for automatically raising the upper member into vehicle obstructing position.

The modification shown in FIG. 10 is similar to that of FIG. 9, except that three tension springs 62 are shown. The upper ends of the springs 62 are connected at 63 to the central tub 13 and the lower ends are connected at 64 to the movable upper member 20. The springs 62 are stretched when the upper member 20 is depressed and automatically raise said member 20 when the locking rod 40 is unlocked by releasing of the catch projection 45 from the flange 15 of central support 13. For this modification, the movable upper member 20 is made longer than it is in the modification of FIG. 9 where a compression spring is employed, and longer than it is in the construction of FIGS. 1–3 where a weight, cables and pulleys are employed.

The operation of the device is as follows: Assume the lower member 10 has been installed adjacent the entrance to a parking area which is barricaded by walls or otherwise so that only one end is available for drive-in entrance of a vehicle. If the upper telescopically mounted vehicle obstructing member 20 is in its raised position, it will obstruct the entrance to the parking area and prevent driving in of a vehicle. The device is automatically locked when the upper housing is in the raised position of FIG. 3. The proprietor of the parking area must then use his key in lock 25 to rotate the bolt 27, and move lever 28 and pin 29 from the position shown in FIG. 3 to the position shown in FIGS. 1 and 2, whereupon the obstructing housing member 20 can be depressed by foot or other pressure to move the said member into non-obstructing position. This presure on lever 28 and pin 29 imparts limited pivotal movement to the locking rod 40 which disengages it from its engagement with flange 15 on central tube 13. When thus depressed, the locking rod 40 moves downwarly and the projection 45 engages the underside of the flange 15 of the central tube 13 as shown in FIGS. 1 and 2. Then the proprietor of the parking area can park his vehicle without obstruction.

To prevent unauthorized removal of the vehicle, the possessor of the key actuates the lock 25 thereby moving lock bolt 27, lever 28 and pin 29 from the FIG. 1 position to that of FIG. 3, to release the retaining means 45 from engagement with flange 15. Thereupon the weight 50 moves downwardly from the FIG. 1 position to that of FIG. 3 and causes the member 20 to move upwardly into the FIG. 3 position, where it is automatically locked by reason of the bearing of the shoulder 46 of locking rod 40 on the upper surface of flange 15 on central tube 13. In this position, the housing member 20 again obstructs the entrance to the parking area and prevents drive-out removal of the parked vehicle.

When the proprietor of the parking area has driven his vehicle out of the parking area, he can of course again unlock the depressed member 20 and permit automatic raising thereof by the weight 50, and automatic locking in raised obstructing position as shown in FIG. 3, thereby preventing unauthorized occupancy of his parking space.

The parking device constructions which employ the springs 60 and 62 of FIGS. 9 and 10 in place of the weight 50, pulleys 53 and cables 51 of the other figures function as heretofore described, employing the same locking rod 40 and actuating parts therefor, to lock the movable member 20 in either raised obstructing position or depressed non-obstructing position. The spring automatically raise the movable member 20 from its lowered position and permit manual depression thereof from its raised position when the locking rod has been freed for movement by unlocking of the lock 25.

Changes may be made in details of construction, in the form and arrangement of parts and in relative dimensions without departing from the scope of the invention as defined by the appended claims.

I claim:

1. A vehicle parking device for obstructing unauthorized removal of a vehicle from a parking area and unauthorized occupancy of a parking area by a vehicle, comprising
    (a) a lower housing member adapted to be stationarily mounted in a parking area with its major portion below ground level,
    (b) an upper vehicle obstructing member telescopically mounted in the lower housing for upward automatic movement into vehicle obstructing position and depressible into non-obstructing position,
    (c) a key actuated lock in the upper member,
    (d) a hollow centrally fixed support in the lower housing member having a top below the level of the lock, (e) a locking rod pivotally mounted near one end in the upper member and having a free end movable relative to the central support, said rod being provided with retaining means cooperating with said central support for retaining the upper member in either its vehicle obstructing or non-obstructing position, (f) means mounted on the locking rod operated by said key actuated lock for pivotally moving the locking rod and releasing the retaining means, and (g) means mounted on the central support and connected to the upper member for automatically raising the member into vehicle obstructing position when the locking rod has been actuated to release the retaining means.

2. The vehicle parking device defined by claim 1 which includes means mounted on one of said upper and lower members and located between said members for preventing freezing and free movement of the upper member.

3. The vehicle parking device defined by claim 1 which includes means on said upper and lower members for guiding the upper member and preventing twisting of the members relatively to each other.

4. The vehicle parking device defined by claim 1 in which the lock comprises an inwardly horizontal extending barrel and bolt, said bolt being operatively connected to the means mounted on the locking rod for pivotally moving the locking rod and releasing the retaining means.

5. The vehicle parking device defined by claim 1 in which the centrally fixed support is a tube provided on its upper end with a radially inwardly directed flange which cooperates with the retaining means on the locking rod to prevent upward movement of the upper member when said member has been depressed and to prevent downward movement of the upper member when said member has been raised to vehicle obstructing position.

6. The vehicle parking device defined by claim 5 in which one of the retaining means on the locking rod is a projection which engages the upper side of the central tube flange and the other of the retaining means is an undercut shoulder which bears on the central tube flange.

7. The vehicle parking device defined by claim 1 in which the means mounted on the locking rod operated by the key actuated lock for pivotally moving the locking rod and releasing the retaining means comprises a lever pivotally movable by the lock and a spring loaded pin pivotally connected at one end to the lever and pivotally connected at its other end to the locking rod.

8. The vehicle parking device defined by claim 1, in which the means for automatically raising the upper member into vehicle obstructing position comprises a weight, a pair of pulleys mounted on the central support, and a pair of cables each connected at one end to the weight, trained over a pulley and connected at the other end to the upper member.

9. The vehicle parking device defined by claim 8 in which the weight is cylindrical in form and slidable on said central support.

10. The vehicle parking device defined by claim 1 in which the means for automatically raising the upper member into vehicle obstructing position comprises a coiled springs surrounding the central support and compressible by the upper member when said member is depressed, and automatically raises said member when the locking rod retaining means are released.

11. The vehicle device defined by claim 1 in which the means for automatically raising the upper member into vehicle obstructing position comprises coiled springs having upper ends attached to the central support and lower ends connected to the movable member, said springs being placed under tension by depression of said movable member, and automatically raise said movable member when the locking rod retaining means are released.

12. A vehicle parking for obstructing unauthorized removal of a vehicle from a parking area and unauthorized occupancy of a parking area by a vehicle, comprising (a) a lower housing member adapted to be stationarily mounted in a parking area with its major portion below ground level, (b) an upper vehicle obstructing member telescopically mounted relatively to the lower housing member, (c) locking means for automatically locking the upper member in either obstructing or non-obstructing position, (d) key actuated means for releasing the locking mechanism when the upper member is in depressed position and for releasing the locking means to permit manual depression of the upper member when in raised position, and (e) means automatically raising the upper member when the locking mechanism has been released.

References Cited

UNITED STATES PATENTS

| | | | |
|---|---|---|---|
| 2,333,274 | 11/1943 | Scannell. | |
| 2,588,502 | 3/1952 | Dunn | 49—35 |
| 2,649,341 | 8/1953 | Stepler | 49—131 X |
| 3,061,960 | 11/1962 | Dull | 49—35 |
| 3,086,430 | 4/1963 | Emmel | 49—49 X |
| 3,118,352 | 1/1964 | Ray et al. | 94—1 |

DENNIS L. TAYLOR, *Primary Examiner.*

U.S. Cl. X.R.

49—131